United States Patent [19]
Sawada

[11] Patent Number: 5,655,929
[45] Date of Patent: Aug. 12, 1997

[54] INSERT TERMINAL, MOLDING APPARATUS FOR MOLDING SAME AND METHOD FOR MOLDING SAME

[75] Inventor: Hisashi Sawada, Yokkaichi, Japan

[73] Assignee: Sumitomo Wiring Systems, Ltd., Yokkaichi, Japan

[21] Appl. No.: 681,929

[22] Filed: Jul. 30, 1996

Related U.S. Application Data

[62] Division of Ser. No. 252,784, Jun. 2, 1994.

[30] Foreign Application Priority Data

Jul. 13, 1993 [JP] Japan .................................. 5-043447

[51] Int. Cl.$^6$ .................................. H01R 13/73
[52] U.S. Cl. .................................. 439/559
[58] Field of Search .................................. 439/736, 559, 439/556, 271, 283, 395, 877, 874, 869, 589

[56] References Cited

U.S. PATENT DOCUMENTS

| | | |
|---|---|---|
| 1,764,662 | 6/1930 | Tomlin . |
| 2,556,148 | 6/1951 | Schaefer . |
| 4,069,289 | 1/1978 | Krasser et al. . |
| 4,091,068 | 5/1978 | Karas . |
| 4,167,300 | 9/1979 | Fisher et al. .................. 439/271 |
| 4,180,301 | 12/1979 | Hutter .................. 439/271 |
| 4,204,739 | 5/1980 | Shoenleben .................. 439/559 |
| 4,391,483 | 7/1983 | Desourteaux .................. 439/271 |
| 5,519,170 | 5/1996 | Nabeshima .................. 439/877 |

FOREIGN PATENT DOCUMENTS

| | | |
|---|---|---|
| 2184387 | 6/1987 | United Kingdom . |
| 2213091 | 8/1989 | United Kingdom . |

*Primary Examiner*—Neil Abrams
*Assistant Examiner*—Brian J. Biggi
*Attorney, Agent, or Firm*—Oliff & Berridge

[57] ABSTRACT

Cutout portions are respectively formed at the lower edges of a pair of terminal plates, one being deeper than the other. At predetermined positions of holding grooves of a lower mold, protruding portions for positioning are formed, by which the terminal plates are positioned when the protruding portions are respectively engaged with the cutout portions. With this construction, terminal plates can be accurately fitted into a holding groove of the mold so that an O-ring can be smoothly attached to the molding.

4 Claims, 2 Drawing Sheets

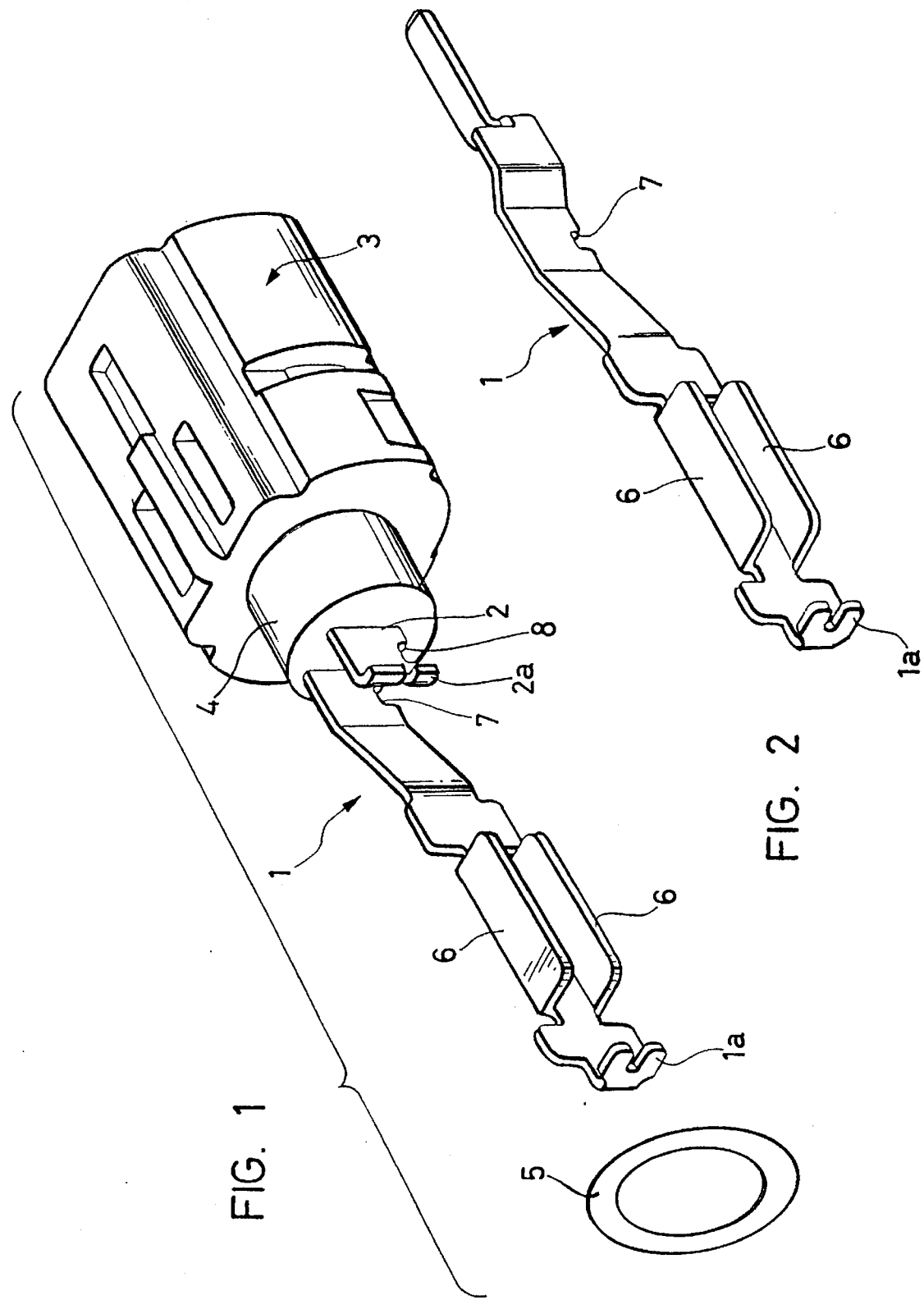

INSERT TERMINAL, MOLDING APPARATUS FOR MOLDING SAME AND METHOD FOR MOLDING SAME

This is a Division of application Ser. No. 08/252,784 filed Jun. 2, 1994.

BACKGROUND OF THE INVENTION

The present invention relates to an insert terminal, a molding apparatus for molding an insert terminal and a method for molding an insert terminal in which a terminal plate is integrated with a resin portion of a terminal convertor assembly.

An insert terminal is molded when a cavity of a mold is filled with resin while a terminal plate is held in a holding groove of the mold. In order to correctly and quickly insert the terminal plate into the holding groove of the mold, and also in order to prevent the terminal plate from moving by the action of resin pressure applied in the process of molding so as to improve the dimensional accuracy, it is preferable to provide a positioning device.

Therefore, as disclosed in Japanese Patent Publication No. 4-60309, a guiding protruding portion is provided at an edge of the terminal plate, and further, a cutout portion engaging the protruding portion is provided in the holding groove of the mold. According to this prior art device, improved positioning accuracy can be provided.

In the case of an insert terminal attached to a mounting hole of an oil tank, a lead switch for a floating mechanism used for measuring an amount of oil in the oil tank is connected to the insert terminal. In this insert terminal, an O-ring assembly cylindrical portion is formed, by which an O-ring is held while a terminal plate penetrates the O-ring. When a guide protruding portion is provided on the aforementioned terminal plate, the O-ring tends to be hooked at the guide protruding portion, and it is difficult to attach the O-ring to the O-ring assembly cylindrical portion, and further, there is a possibility that the O-ring can be damaged. Still further, an inner diameter of the O-ring must be determined to be large so that the O-ring can be outwardly provided in the guide protruding portion. Therefore, it is necessary to use an O-ring of large diameter. Accordingly, the diameter of the mounting hole of the oil tank must be increased. As described above, there are many restrictions in the design of the apparatus.

SUMMARY OF THE INVENTION

It is an object of the present invention to overcome the disadvantages of the prior art devices by providing an insert terminal in which the O-ring can be assembled without damage caused thereto.

According to a first aspect of the present invention, there is provided a molding apparatus for molding an insert terminal in which a terminal plate is integral with a resin portion when the terminal plate is held in a holding groove of a mold and a cavity of the mold is filled with resin, wherein the resin portion includes an O-ring assembly cylindrical portion that holds an O-ring assembled to it when the terminal plate penetrates the O-ring. A cutout portion is formed on the terminal plate, and a protruding portion for positioning the terminal plate by engaging with the cutout portion is formed in the holding groove of the mold.

In another aspect of the present invention, there is provided a terminal plate molding apparatus for molding a terminal plate to a resin comprising a mold having a resin injection port in communication with at least one holding groove. The at least one holding groove includes a molding protrusion engageable with a corresponding recess located on the terminal plate.

In yet another aspect of the present invention, there is provided an insert terminal comprising an O-ring assembly portion, a terminal plate integrally connected to the O-ring assembly portion, the terminal plate having a positioning member located adjacent the O-ring assembly portion, and an O-ring engageable with the O-ring assembly portion. With this structure, the terminal plate positioning member is sufficiently dimensioned to allow the O-ring to pass along the terminal plate without causing damage to the O-ring.

In still another aspect of the present invention, there is provided a method for integrally forming an O-ring engagement portion and a terminal plate of an insert terminal. The method includes the steps of providing a mold having an injection port, forming a positioning groove on the mold and a molding protrusion in the positioning groove, providing a terminal plate with a cutout portion along an edge thereof, positioning the terminal plate in the positioning groove while registering the molding protrusion with the cutout portion, and injecting a resin through the injection.

With an insert terminal constructed as described above, when a cutout portion of the terminal plate is engaged with a positioning protruding portion, which is formed in the holding groove of the mold, the terminal plate can be correctly positioned in the holding groove, and the dimensional accuracy of the terminal plate can be improved. Since the cutout portion is formed for positioning on the terminal plate, when an O-ring is assembled to an O-ring assembling cylindrical portion of the molded inset terminal, there is no possibility that the O-ring is hooked, so that the assembling process can be smoothly and quickly carried out, and further there is no possibility that the O-ring will be damaged. Furthermore, a diameter of the O-ring can be reduced to a value at which the O-ring can be outwardly provided to the terminal plate.

BRIEF DESCRIPTION OF THE DRAWINGS

The invention will now be described in detail with reference to the following drawings wherein:

FIG. 1 is a perspective view of the insert terminal relating to an embodiment of the present invention.

FIG. 2 is a perspective view of the long terminal plate.

DETAILED DESCRIPTION OF PREFERRED EMBODIMENTS

Figure 3:
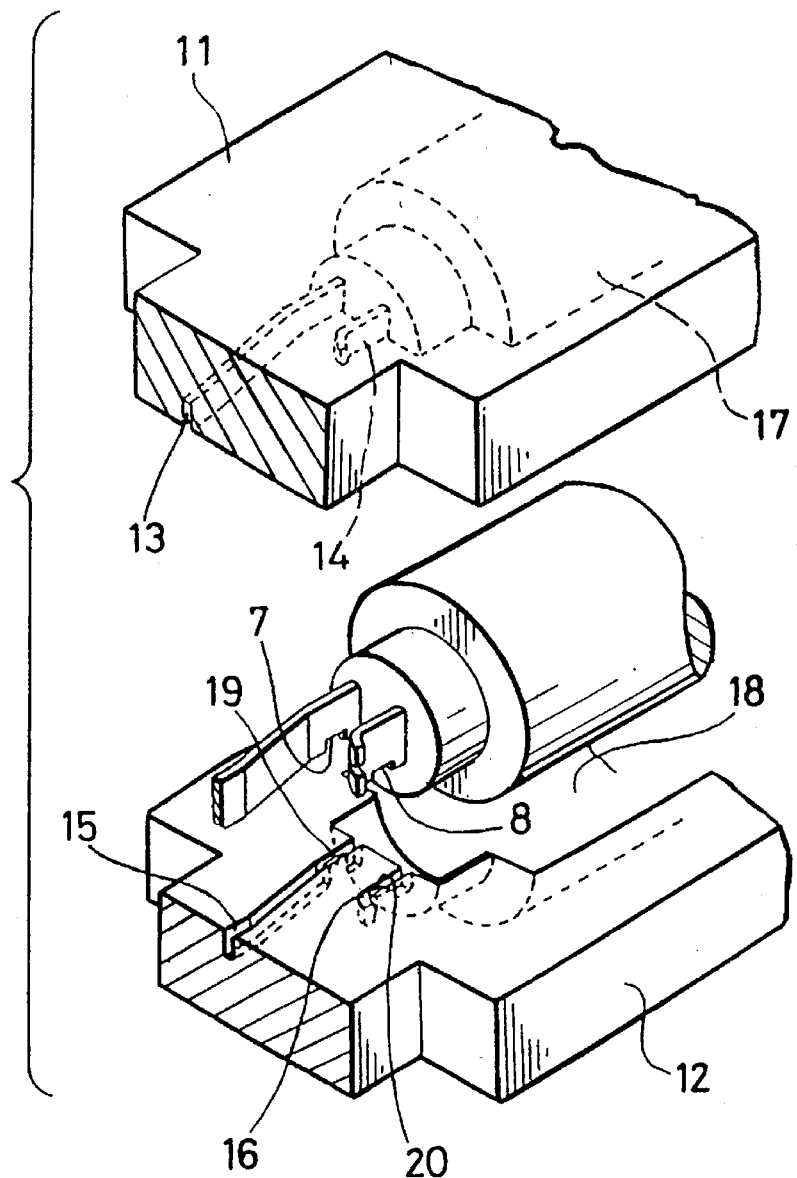
FIG. 3 is a partially cut-away perspective view of the molding apparatus of the embodiment.

With reference to FIGS. 1 to 3, an embodiment will be explained as follows, in which the present invention is applied to the molding of an insert terminal for mounting a lead switch used for measuring an amount of oil in an oil tank, however, the invention is not meant to be limited thereto.

Figure 4:
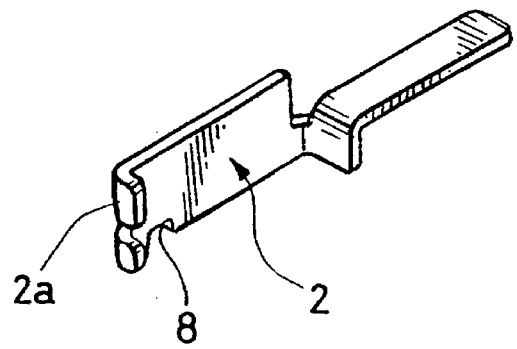
FIG. 4 is a perspective view of the short terminal plate.

As illustrated in FIGS. 1, 2 and 4, the insert terminal of this embodiment includes a first plate 1, a second terminal plate 2 having a length shorter than the length of the first terminal plate, and a resin portion 3 from which an O-ring engagement or assembly portion 4 protrudes. The engagement portion is adapted to receive an O-ring 5 after integrally forming terminal plates 1, 2 and the resin portion 3 in a single-piece body. Between a pair of mounting plates 6 formed on the sides of the long terminal plate 1, a lead switch (not shown) is provided that responds to a movement of the float accommodated in an oil tank (not shown). Lead wires drawn out from both ends of the lead switch are connected with connecting portions 1a, 2a that are provided at the ends of both terminal plates 1, 2, respectively. The O-ring 5 is attached to the O-ring assembly cylindrical portion 4 of the resin portion 3, and the O-ring assembly cylindrical portion 4 is inserted into and fixed to a mounting hole formed in the oil tank. In this way, the lead switch is positioned in the oil tank while the opening of the mounting hole is tightly sealed.

In this connection, a molding apparatus for molding the insert terminal described above will be explained as follows.

In FIG. 3, reference numerals 11 and 12 correspond respectively to an upper and a lower mold. In both molds 11 and 12, holding grooves 13, 14 and 15, 16 for holding the terminal plates 1 and 2 are correspondingly formed, and also cavities forming injection ports 17 and 18 for forming the resin portion 3 including the O-ring assembly cylindrical portion 3 are correspondingly formed.

In this embodiment, cutout portions 7 and 8 are respectively formed at lower edges of the terminal plates 1 and 2, and at predetermined positions of the holding grooves 15 and 16 of the lower mold 12, protruding portions 19 and 20 for positioning are formed so that the protruding portions 19 and 20 are engageable with the cutout portions 7 and 8 of the terminal plates 1 and 2.

In the process of molding, while the cutout portions 7 and 8 of both terminal plates 1 and 2 are engaged with the protruding portions 19 and 20 for positioning, both terminal plates 1 and 2 are inserted into the corresponding holding grooves 15 and 16. Due to the foregoing, the terminal plates 1 and 2 are accurately positioned, and the lower halves are held in the holding grooves 15 and 16 of the lower mold 12.

Next, while the upper halves of the terminal plates 1 and 2 are engaged with the holding grooves 13 and 14, the upper mold 11 is fastened to the lower mold 12, and resin is injected into the cavities 17 and 18 of both molds 11 and 12. In this way, the cavities are filled with resin, and the molding operation is completed. After that, both molds 11 and 12 are separated from each other, and the insert terminal shown in FIG. 1 can be obtained, in which both terminal plates 1 and 2 are integrated or molded with the resin portion 3. Since the terminal plates 1 and 2 have been positioned at this time, they are prevented from moving even when the resin injection pressure is applied to them, so that the dimensions can be accurately improved.

In the case where the O-ring 5 is attached to the formed insert terminal, outer circumferences of both terminal plates 1 and 2 penetrate the O-ring 5, so that the O-ring 5 is engaged with the assembly cylindrical portion 4. Because the terminal plates 1 and 2 are provided with the cutout portions 7 and 8 for positioning, there is no possibility that the O-ring 5 is hooked in the process of attachment. Therefore, the O-ring 5 can be smoothly attached, and further, there is no possibility that the O-ring 5 will be damaged.

Furthermore, a diameter of the O-ring is reduced to a value at which the O-ring can be outwardly provided to the terminal plates 1 and 2. Accordingly, the diameter of the mounting hole of the oil tank can be reduced. In this way, the degree of freedom can be extended in the design of the apparatus.

While the invention has been described in detail with reference to preferred embodiments thereof, which are intended to be illustrative and not limiting, various changes may be made without departing from the spirit and scope of the invention. For example, the cutout portions may be provided at the upper edges of the terminal plates 1 and 2, and further, the cutout portions may be provided at both upper and lower edges. In addition, the present invention is not limited to oil tanks, but can be applied to a wide variety of applications in which O-rings are attached to connector terminals.

What is claimed is:

1. An insert terminal comprising an O-ring assembly portion, a terminal plate integrally connected at a first end to said O-ring assembly portion and extending in one direction to a second end, said terminal plate having a positioning member located adjacent said O-ring assembly portion at the first end of the terminal plate, and an O-ring engageable with said O-ring assembly portion, said terminal plate positioning member being dimensioned to allow the O-ring to slide over the terminal plate from the second end to the first end without causing damage to said O-ring.

2. The insert terminal of claim 1, wherein the positioning member comprises a positioning cutout located in said terminal plate.

3. The insert terminal of claim 1, further comprising mounting plates located in a mid-section of said terminal plate between said first end and said second end and a connector portion located at the first end of the terminal plate.

4. The insert terminal of claim 1, wherein said O-ring assembly portion comprises a resin material and said terminal plate comprises a metallic material.

* * * * *